United States Patent
Dowling et al.

(10) Patent No.: US 12,265,961 B2
(45) Date of Patent: Apr. 1, 2025

(54) SYSTEMS AND METHODS FOR SENDING AND RECEIVING MATH-BASED CURRENCY VIA A FIAT CURRENCY ACCOUNT

(71) Applicant: Wells Fargo Bank, N.A., San Francisco, CA (US)

(72) Inventors: Michael D. Dowling, San Francisco, CA (US); Jesse K. Lund, Coto de Caza, CA (US); Frank S. Lee, Bakersfield, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 85 days.

(21) Appl. No.: 18/346,744

(22) Filed: Jul. 3, 2023

(65) Prior Publication Data

US 2023/0342759 A1 Oct. 26, 2023

Related U.S. Application Data

(63) Continuation of application No. 17/888,403, filed on Aug. 15, 2022, now Pat. No. 11,727,395, which is a
(Continued)

(51) Int. Cl.
G06Q 20/38 (2012.01)
G06Q 20/06 (2012.01)
G06Q 20/42 (2012.01)

(52) U.S. Cl.
CPC ......... *G06Q 20/381* (2013.01); *G06Q 20/065* (2013.01); *G06Q 20/42* (2013.01)

(58) Field of Classification Search
CPC ..... G06Q 20/42; G06Q 20/065; G06Q 20/381
See application file for complete search history.

(56) References Cited

U.S. PATENT DOCUMENTS 10,269,009 B1   4/2019 Winklevoss et al.
11,062,278 B1 * 7/2021 Kurani .................. G06Q 20/10
(Continued)

FOREIGN PATENT DOCUMENTS

IN   20150023713 A   7/2016
WO  WO-2016/204461   12/2016

OTHER PUBLICATIONS

Tschorsch Florian, Scheuermann Bjorn, "Bitcoin and Beyond: A Technical Survey on Decentralized Digital Currencies", Aug. 19, 2016, IEEE Communications Surveys and Tutorials vol. 18 No. 3 (Year: 2016).

(Continued)

*Primary Examiner* — Scott S Trotter
(74) *Attorney, Agent, or Firm* — Foley & Lardner LLP

(57) ABSTRACT

A method performed by a processor of a financial institution computing system includes authorizing an account holder to execute transactions in an MBC from a financial account of the account holder that includes funds in a fiat currency. A transaction request is received, including a request to transfer a first amount of funds from the financial account to a recipient. The first amount is defined in MBC. The financial account is debited by a second amount, which is an amount of fiat currency equivalent to the first amount of MBC. A service call is transmitted to the MBC partner. The service call includes instructions to create a temporary account to hold the MBC, to exchange the second amount from fiat currency to MBC, to credit the temporary account with the funds exchanged to MBC, and to transfer the first amount in MBC from the temporary account to the recipient.

20 Claims, 7 Drawing Sheets

Related U.S. Application Data continuation of application No. 15/387,862, filed on Dec. 22, 2016, now Pat. No. 11,416,849.

(60) Provisional application No. 62/297,609, filed on Feb. 19, 2016.

(56) References Cited

U.S. PATENT DOCUMENTS

| | | |
|---|---|---|
| 2010/0280948 A1 | 11/2010 | Cohen |
| 2014/0244500 A1 | 8/2014 | Elias |
| 2014/0351072 A1 | 11/2014 | Wieler et al. |
| 2015/0332256 A1 | 11/2015 | Minor |
| 2015/0363769 A1* | 12/2015 | Ronca ............... G06Q 20/381 705/64 |
| 2015/0363778 A1 | 12/2015 | Ronca et al. |
| 2015/0365283 A1 | 12/2015 | Ronca et al. |
| 2015/0371224 A1 | 12/2015 | Lingappa |
| 2016/0203496 A1 | 7/2016 | Guerrero et al. |
| 2016/0267471 A1 | 9/2016 | Gramenov |
| 2016/0292680 A1 | 10/2016 | Wilson et al. |
| 2016/0330027 A1 | 11/2016 | Ebrahimi |
| 2016/0342976 A1 | 11/2016 | Davis |
| 2016/0342978 A1 | 11/2016 | Davis et al. |
| 2016/0342994 A1 | 11/2016 | Davis |
| 2017/0140371 A1 | 5/2017 | Forzley et al. |
| 2017/0230375 A1 | 8/2017 | Kurian |
| 2017/0300898 A1 | 10/2017 | Campero et al. |
| 2017/0331896 A1 | 11/2017 | Holloway et al. |
| 2017/0372278 A1 | 12/2017 | Frolov et al. |
| 2018/0060927 A1 | 3/2018 | Gupta |

OTHER PUBLICATIONS

Nakamoto, Satoshi, "Bitcoin: A Peer-to-Peer Electronic Cash System", www.bitcoin.org, 2008. 9 pages.

Notice of Allowance on U.S. Appl. No. 17/888,403 dated Mar. 31, 2023 (26 pages).

Peters et al., "Understanding Modern Banking Ledgers through Blockchain Technologies: Future of Transaction Processing and Smart Contracts on the Internet of Money", Nov. 19, 2015. 33 pages.

Swanson, Tim, "Consensus-as-a-service: a brief report on the emergence of permissioned, distributed ledger systems", Apr. 6, 2015. 66 pages.

W.-T. Tsai, R. Blower, Y. Zhu and L. Yu, "A System View of Financial Blockchains," Mar. 29, 2016 IEEE Symposium on Service-Oriented System Engineering (SOSE), 2016, pp. 450-457, doi: 10.1109/SOSE.2016.66. (Year: 2016).

Wood, Gavin Dr., "Ethereum: A Secure Decentralised Generalised Transaction Ledger", Homestead Draft, 2014. 32 pages.

X. Dai, K. Chaudhary and J. Grundy, "Comparing and Contrasting Micro-payment Models for Content Sharing in P2P Networks," Dec. 18, 2007, Third International IEEE Conference on Signal-Image Technologies and Internet-Based System, 2007, pp. 347-354, doi: 10.1109/SITIS.2007.63. (Year: 2007).

* cited by examiner

SYSTEMS AND METHODS FOR SENDING AND RECEIVING MATH-BASED CURRENCY VIA A FIAT CURRENCY ACCOUNT

CROSS-REFERENCE TO RELATED PATENT APPLICATIONS

This application claims the benefit of priority under 35 U.S.C. § 120 as a continuation of U.S. patent application Ser. No. 17/888,403, filed Aug. 15, 2022, which claims the benefit of priority under 35 U.S.C. § 120 as a continuation of U.S. patent application Ser. No. 15/387,862, issued as U.S. Pat. No. 11,416,849, filed Dec. 22, 2016, which claims priority under 35 U.S.C. § 119 to U.S. Provisional Patent Application No. 62/297,609 entitled "SYSTEMS AND METHODS FOR SENDING AND RECEIVING MATH-BASED CURRENCY VIA A FIAT CURRENCY ACCOUNT" filed Feb. 19, 2016, which is incorporated herein by reference in its entirety.

BACKGROUND

Math-based currency ("MBC"), commonly referred to as digital currency, is rising in popularity, use, and public acceptance. MBC differs from fiat currency (i.e., currency that is declared by a government to be a legal tender) in that principles of cryptography are used to create, secure, and transfer MBC directly from a first user to a second user. A user can transfer MBC funds to another party by using a private key associated with of the user's MBC wallet. The private key may be used to generate a signature for the transaction, and the signature can be verified by nodes in the MBC network, thereby completing the transaction. Additional information, including the identities of the parties involved in the exchange, is not required to effectuate the transaction. Accordingly, MBC allows for pseudonymous transfers of currency between users without the reliance on financial institutions (e.g., banks) to facilitate the transfer. Examples of MBCs include Bitcoin, Ripple, Litecoin, Peercoin, and Dogecoin, among others.

SUMMARY

Various embodiments relate to a method performed by a processor of a financial institution computing system. The method can include receiving, by a processor of a financial institution computing system, a request to transfer to a recipient a first amount of funds denominated in a math-based currency (MBC) from a financial account denominated in a fiat currency and assigned to an account holder. The method can include debiting, by the processor, the financial account by a second amount of funds denominated in a fiat currency and equivalent to the first amount of funds denominated in MBC. The method can include transmitting, concurrently with the debiting, by the processor to an MBC partner, instructions to create a temporary account at the MBC partner denominated in MBC, the temporary account associated with the financial institution and separate from the financial account associated with the account holder, exchange, from fiat currency at a reserve account provided by and assigned to the financial institution computing system and denominated in the fiat currency, the second amount of funds to MBC currency at the MBC partner, credit the temporary account with funds from the MBC partner comprising the first amount, and transfer the first amount of funds in MBC from the temporary account to the recipient, by establishing a real-time communication channel with the MBC partner, transmitting, in real-time with the debiting, by the processor to the MBC partner in response to receiving the transaction request, a request for a first current exchange rate between fiat currency and MBC, wherein the second amount is determined based on the first current exchange rate, and transmitting, by the processor to the MBC partner, fees associated with the MBC partner.

Various other embodiments relate to a financial institution computing system. The system can receive a request to transfer to a recipient a first amount of funds denominated in a math-based currency (MBC) from a financial account denominated in a fiat currency and assigned to an account holder. The system can debit the financial account by a second amount of funds denominated in a fiat currency and equivalent to the first amount of funds denominated in MBC. The system can transmit, concurrently with the debiting, by the processor to an MBC partner, instructions to create a temporary account at the MBC partner denominated in MBC, the temporary account associated with the financial institution and separate from the financial account associated with the account holder, exchange, from fiat currency at a reserve account provided by and assigned to the financial institution computing system and denominated in the fiat currency, the second amount of funds to MBC currency at the MBC partner, credit the temporary account with funds from the MBC partner comprising the first amount, and transfer the first amount of funds in MBC from the temporary account to the recipient, by establishing a real-time communication channel with the MBC partner, transmitting, in real-time with the debiting, by the processor to the MBC partner in response to receiving the transaction request, a request for a first current exchange rate between fiat currency and MBC, wherein the second amount is determined based on the first current exchange rate, and transmitting, by the processor to the MBC partner, fees associated with the MBC partner.

Various other embodiments relate to a computer readable medium including one or more instructions stored thereon and executable by a processor of a financial institution computing system. The processor can receive a request to transfer to a recipient a first amount of funds denominated in a math-based currency (MBC) from a financial account denominated in a fiat currency and assigned to an account holder. The processor can debit the financial account by a second amount of funds denominated in a fiat currency and equivalent to the first amount of funds denominated in MBC. The processor can transmit, concurrently with the debiting to an MBC partner, instructions to create a temporary account at the MBC partner denominated in MBC, the temporary account associated with the financial institution and separate from the financial account associated with the account holder, exchange, from fiat currency at a reserve account provided by and assigned to the financial institution computing system and denominated in the fiat currency, the second amount of funds to MBC currency at the MBC partner, credit the temporary account with funds from the MBC partner comprising the first amount, and transfer the first amount of funds in MBC from the temporary account to the recipient, by establishing a real-time communication channel with the MBC partner, transmitting, in real-time with the debiting, by the processor to the MBC partner in response to receiving the transaction request, a request for a first current exchange rate between fiat currency and MBC, wherein the second amount is determined based on the first current exchange rate, and transmitting, by the processor to the MBC partner, fees associated with the MBC partner.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
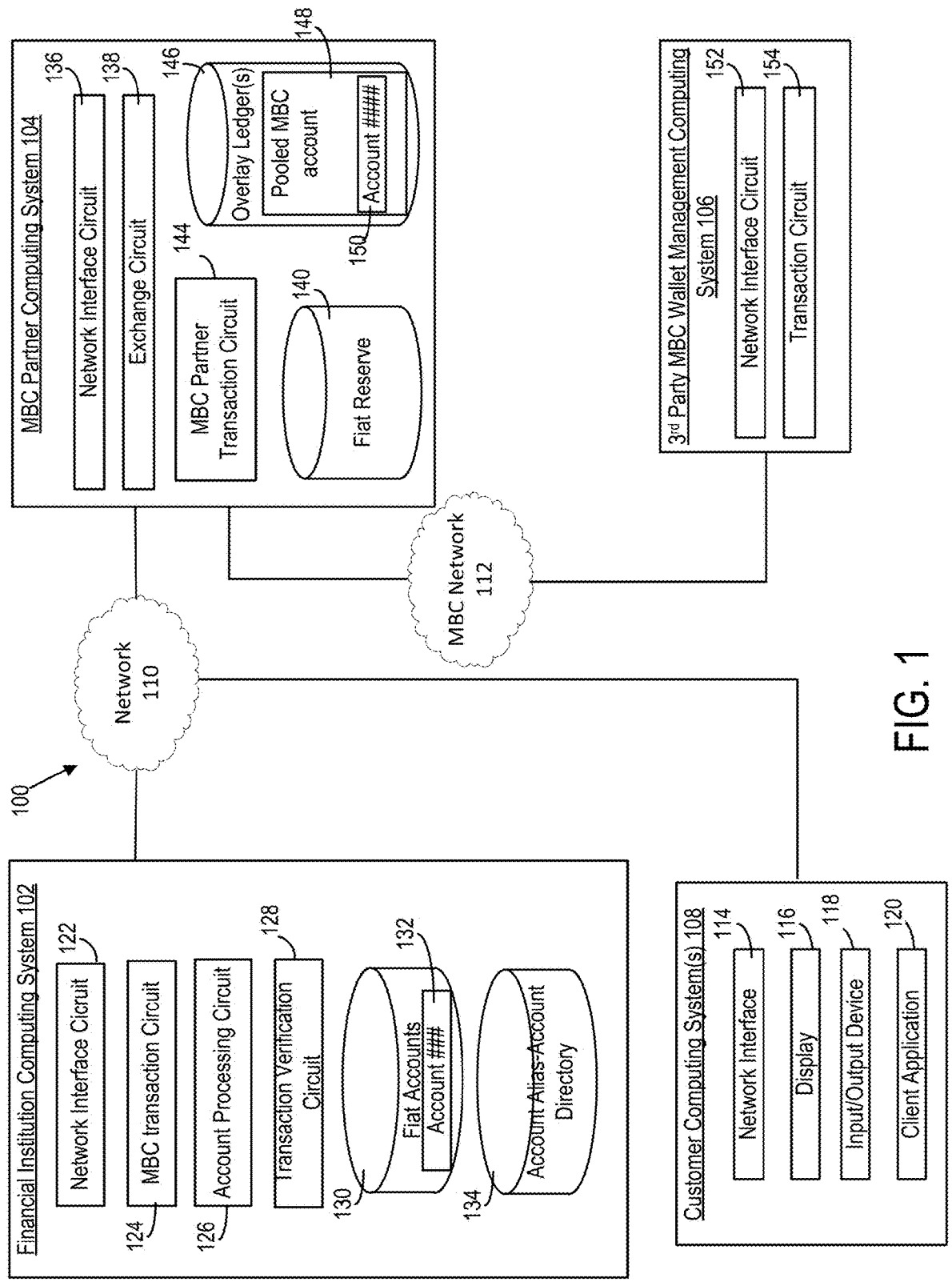
FIG. 1 is a schematic diagram of a transaction processing system, according to an example embodiment.

Current MBC ecosystems are complicated and cumbersome to use. For example, in order to transact using MBC, a customer must establish an MBC wallet, which manages the customer's public/private key pair(s). The customer must fund the wallet by exchanging fiat currency for MBC, which takes some time. Generally, neither the fiat currency nor the MBC is available to use when the funds are in suspense at the exchange. In addition, customers must manage send and receive addresses for themselves and for other users with whom they conduct transactions. Accordingly, many individuals have failed to conduct MBC transactions due to the technical complexity of doing so.

In addition, although MBC transactions settle much more quickly than conventional fiat transactions, true real-time payments are not possible with current MBC systems. For example, an MBC transaction cannot be considered to be confirmed and not double-spent until the transaction has been included in at least one block in the blockchain, which may take approximately ten minutes in certain MBC systems. Accordingly, current MBC ecosystems are not capable of real-time or near real-time transactions.

Referring generally to the figures, systems and methods for sending and receiving non-primary currencies via a primary fiat currency (e.g., U.S. dollars, euros, yen, etc.) account are described. In some example embodiments, non-primary currencies are MBC. Although example embodiments are described herein with respect to MBC, it should be understood that the systems and methods described herein may similarly be used to transfer any type of currency. Embodiments described herein allow a customer (e.g. an account holder at the financial institution) of a financial institution to use his or her existing financial account to send and receive MBC of any coin type, of some destination or origin, through an easy to use interface provided by the financial institution. The account holder interacts only with the financial institution, providing the financial institution with the relevant transaction details, and on the back-end the financial institution works with an MBC partner exchange entity to accomplish the account holder's transaction requests. The MBC partner is responsible for holding enough fiat currency in reserve (or has access to a short-term lending facility to provide liquidity when necessary) in order to coordinate MBC acquisition or liquidation on the existing MBC markets and to provide the account holder with near-instant completion of transaction requests. Further, all MBC balances for the account holders are held at the MBC partner with the ability to instantly exchange the value from fiat to MBC and vice versa, without risks or hassle of the existing user set-up. In some embodiments, the MBC partner is a part of the financial institution. Various embodiments allow holders of a financial institution banking account to perform near real-time transactions involving an MBC to utilize banking services such as direct deposits, transfers of funds outside of the financial institution, withdrawal services, payment services, and the like. In one embodiment, a method enables near real-time transactions, of different asset classes and different currencies of origination. For example, the account holder may send MBC currency from his or her financial account. The account holder may also receive funds of any currency, which will settle in the account holder's financial account in the form of fiat currency. The method provides the account holder with the ability to transact with MBC without actually having to interact with the actual MBC systems.

According to various example embodiments, as described in further detail below, systems and methods for sending and receiving non-primary currencies (e.g., MBC) via a fiat currency account provide technical solutions to internet-centric and computer-centric problems associated with conducting MBC transactions. For example, various embodiments reduce the number of steps and simplify the process required to exchange fiat currency to MBC and to execute transactions in MBC. Existing MBC systems require users to manage complex MBC wallets to conduct transactions. In addition, MBC wallets must first be funded using fiat currency prior to conducting transactions in MBC. In contrast, various embodiments described herein enable users to easily send and receive MBC directly from the users' financial accounts. As another example, various embodiments facilitate real-time or near real-time transactions. As mentioned above, current MBC systems require some time (e.g., approximately ten minutes) to be confirmed. In contrast, embodiments described herein enable true real-time or near real-time transactions. The embodiments described herein also use less memory on a customer's mobile devices, as the customer is able to use the existing financial institution mobile banking application to complete these MBC transactions, without having to allocate memory and resources in installing and running separate MBC wallet applications for each MBC coin type.

FIG. 1 is a schematic diagram of a transaction processing system 100, according to an example embodiment. The transaction processing system 100 includes a financial institution computing system 102, an MBC partner computing system 104, a third-party MBC wallet management computing system 106, and one or more customer computing systems 108. Each of the financial institution computing system 102, the MBC partner computing system 104, and the customer computing systems 108 are in operative communication with each other via a network 110. The network 110 may include, for example, the Internet, cellular networks, proprietary banking networks, and the like. The MBC partner computing system 104 and the third-party MBC wallet management computing system 106 are in operative communication via a MBC network 112. The MBC network 112 may include, for example the Internet, cellular networks, proprietary banking networks, and the like.

Generally, customers may use the transaction processing system 100 to send and receive MBC of any coin type, of some destination or origin, through an easy to use interface provided by the financial institution. The customer may provide straight-forward transaction details (e.g., recipient, transaction amount in fiat currency or MBC, etc.) to the financial institution via the easy-to-use interface to conduct transactions via the customer's existing fiat account. The financial institution automatically generates and executes commands to direct the MBC partner to complete the customer's request, ultimately resulting in the customer's MBC transaction being completed.

The financial institution computing system 102 includes a network interface circuit 122, an MBC transaction circuit 124, an account processing circuit 126, a transaction verification circuit 128, a financial account database 130, and an account alias-account directory 134. The financial institution computing system 102 may, for example, include one or more servers each with one or more processors configured to execute instructions stored in a memory, send and receive data stored in the memory, and perform other operations to implement the financial services described herein associated with the processing modules, databases, and processes.

The network interface 122 is structured to facilitate operative communication between the financial institution computing system 102 and other systems and devices over the network 110.

The MBC transaction circuit 124 is structured to facilitate the back-end processes necessary to conduct MBC transactions via the customer's financial account 132. For example, the MBC transaction circuit 124 is structured to generate and send instructions (e.g., based on a customer transaction request) to the MBC partner to facilitate the MBC transactions. The MBC transaction circuit 124 is structured to facilitate both transmission of MBC from the customer's financial account 132 and receipt of MBC to the customer's financial account 132. For example, transmission of MBC may be initiated in response to transaction requests received from a customer. Conversely, receipt of MBC may be initiated by transactions received from various third-party users, such as a third-party user having an MBC account managed by the third-party MBC wallet management computing system 106.

To enroll in the service, the customer transfers various information to the MBC transaction circuit 124, for example, the customer's deposit account for receiving and sending MBC. The MBC transaction circuit 124 compiles the information and transmits the information to the MBC partner computing system 104 with instructions to create an MBC account for the customer. In some embodiments, the MBC account is a temporary account that is used for only one transaction. Upon completing the transaction, the temporary MBC account is closed. In other embodiments, the customer may conduct multiple MBC transactions using the MBC account.

The MBC transaction circuit may associate a customer's MBC account with an account alias. The account alias can be the MBC account wallet address, which may be used to send and receive MBC on behalf of the customer. In some embodiments, the account alias is a hash of the public key associated with the customer's MBC account. In other embodiments, to provide an even easier process for the customer, the account alias may be a pointer to the customer's MBC account wallet address. For example, in one embodiment, the account alias may include a link that the customer can use publically to facilitate receipt of MBC. For example, in one embodiment, the financial institution generates a link that can be publically provided to third-parties. When the link is accessed by a third-party, the financial institution transmits a request to the MBC partner, which generates the MBC address used to facilitate an MBC deposit to the customer. In one embodiment, a third-party sender accesses the account alias via a link and is connected with the financial institution computing system 102. The financial institution computing system 102 provides the third-party sender with the MBC address for the customer (e.g., a hash of the public key assigned to the customer). When a third-party sender accesses the link, the financial institution computing system 102 sends a request to the MBC partner computing system 104 to create a new public key and assign it to an account alias for the customer, which is then provided to the third-party sender through the financial institution. The MBC partner computing system 104 keeps track of all the public keys and account aliases generated for a customer and pings the financial institution computing system 102 when an account alias receives MBC.

In some embodiments, the MBC transaction circuit 124 is structured to transfer the fiat funds from the customer's account to the MBC partner to use to purchase the desired MBC. The amount of funds to be transferred may be defined by the customer in the form of fiat currency or MBC. In one example embodiment, a customer may request to transfer ten U.S. dollars in the form of an MBC to a recipient. Upon receiving the request, the MBC transaction circuit 124 determines the resulting amount of MBC (e.g., number of MBC coins) equivalent to the ten U.S. dollars. The MBC transaction circuit 124 does this by requesting from the MBC partner a market exchange rate for the fiat currency and the requested MBC. The MBC transaction circuit 124 then determines, based on the current exchange rate, the amount of MBC that is equivalent to the provided amount of fiat currency. In another example embodiment, a customer may request to transfer an amount of MBC, for example ten MBC coins, to a recipient. Upon receiving the request, the MBC transaction circuit 124 determines the resulting amount of fiat currency equivalent to ten MBC coins. The MBC transaction circuit 124 does this by requesting from the MBC partner a market exchange rate for the fiat currency and the requested MBC. The MBC transaction circuit 124 then determines, based on the current exchange rate, the amount of fiat currency that is equivalent to the requested amount of MBC coin. In some embodiments, the MBC transaction circuit 124 calculates transaction fees associated with completing the transaction, returning the amount of fees and the amount of fiat currency required to complete the transaction In some embodiments, the MBC transaction circuit 124 is structured to receive MBC from a third-party, and to deposit the received MBC as fiat currency into the customer's fiat currency account. In an example embodiment, the MBC transaction circuit will receive a notification from the MBC partner that MBC funds have been deposited in an MBC account managed by the MBC partner, and corresponding to the account alias. The customer is notified of the deposit and is given the deposit details, including the MBC deposited and the equivalent amount in fiat currency that would be deposited into the customer account if the deposit is approved. If approved, the MBC transaction circuit 124 transmits a request to the MBC partner to exchange the MBC in the MBC account for a fiat currency, which will be deposited into the customer's account. In some embodiments, the MBC transaction circuit 124 will ensure that the market exchange rate prior to and after the approval of the deposit by the customer are substantially similar to protect against dramatic fluctuations in the MBC exchange rate. If such a fluctuation occurs, within a predetermined threshold, the MBC transaction circuit 124 may require another approval by the customer, reflecting the new transaction values.

In one embodiment, the MBC transaction circuit 124 communicates with the third-party sender/recipient on behalf of the customer to receive the third party's MBC wallet address. For example, in some embodiments, the customer enters an identifier associated with the individual, such as an email address or phone number of the third-party recipient, to initiate an MBC transaction with the third-party recipient. The financial institution computing system 102 may then contact the third-party recipient (e.g., via email, a web interface, etc.) to receive the recipient's MBC wallet address. This feature ensures that the funds of MBC get sent to the customer's intended recipient and eases the burden on the customer, as they do not need to know or properly enter an MBC address, but rather just an email address. Further, this feature also allows the financial institution to comply with Know Your Customer ("KYC") banking regulations. For example, a customer could provide a transaction request to send 10 MBC coins to JSmith@email.com. The financial institution computing system 102 may then generate an email request to the address requiring the user at JSmith@email.com to provide identification details, such as the user's name, physical address, social security number, MBC address, etc. Accordingly, the financial institution computing system 102 may use the user's identification information to verify the user's probity and integrity, thereby complying with KYC regulations so as to prevent identity theft, financial fraud, money laundering, terrorist financing, etc.

The account processing circuit 126 is structured to track, maintain and incorporate transaction details for an account enrolled in the MBC transaction service with the financial institution. The account processing circuit 126 interacts with the MBC transaction circuit 124 to ensure that when a customer makes a request to send MBC to a third-party, that the funds of fiat currency are debited from the proper customer account. The account processing circuit 126 ensures that the customer is authorized to use the customer's existing financial account to send and receive MBC. Additionally, the account processing circuit 126 may store all transaction information in a storage database 130 within the financial institution computing system 102. In some embodiments either the MBC partner computing system 104 or the financial institution computing system 102 keeps track of all email addresses that receive or send MBC from a customer, in order to comply with any regulatory rules. In other embodiments, both the financial institution and the MBC partner computing systems 102, 104 keep track of this information.

The transaction verification circuit 128 is structured to approve or deny a requested transaction to transfer fiat funds to or from the customer's account. The transaction verification circuit 128 is in communication with the MBC transaction circuit 124 to determine if the request received by the MBC transaction circuit 124 is approved given the customer's account. For example, the transaction verification circuit 128 may perform a check to determine if there are sufficient funds to complete the transaction, that the customer account has not exceeded any limits set, whether there are suspicious transaction requests or activity with the account, etc. If the transaction is determined to be acceptable, the transaction verification circuit 124 allows the request to the MBC partner over the network 110 to transfer the funds to the appropriate final currency form. In some embodiments, the transaction verification circuit 128 is structured to facilitate the transfer of the fiat funds to the MBC partner to complete the MBC exchange request.

The financial account database 130 is structured to store account information and transaction records for a plurality of customers of the financial institution. The accounts database 130 may store, for example, information regarding an account holder's, age, membership date, account numbers and type of accounts held by the customer, various statements (e.g., credit/debit statements for the accounts), passkey information, and so on for a plurality of account holders. The account database 130 may store details regarding types of accounts held within a financial institution, the type of account holder, whether he or she is authorized for the MBC transaction service and, his or her account alias, and so on for a plurality of users. For example, a specific account 132 authorized to engage in the MBC transaction service may have multiple account aliases that are generated and managed by the MBC partner computing system 104. In particular, the account database 130 may store each transaction that occurred, and each payment may include the amount of the transaction, the MBC type and the source or recipient of the transaction.

The account alias-account directory 134 is structured to manage the account aliases that are connected to the proper respective account holders and financial accounts within the financial institution. The account alias-account directory 134 is a collection of all account aliases for an account holder at the financial institution. The directory is used to match an incoming ping from the MBC partner computing system 104 that MBC has been deposited into an MBC wallet identified by an account alias associated with an account holder of the financial institution computing system 102. The incoming ping, containing the account alias, is cross-referenced with the information in the account alias-account directory 134 to determine the account holder's identity and to provide the account holder with the details to accept the deposit. In other embodiments, the account alias-account directory 134 is also stored on the MBC partner computing system 104 and the MBC partner's ping includes the account alias and account holder information to the financial institution computing system 102 which is validated by the account alias-account directory 134.

In addition to providing MBC transaction services, the financial institution may also offer traditional fiat currency banking services through the financial institution computing system 102 that may include the management of a plurality of customer accounts 130, which may be associated with customers authorized to engage in the offered MBC transaction services and customers who are not authorized. The fiat banking services may include demand deposit accounts, credit services, loan services, investment services, and the like. In order to become an account holder, the customer may provide personal information (e.g., name, address, date of birth, social security number, tax identifications, etc.) to the financial institution and submit to any necessary background checks.

The MBC partner computing system 104 includes a network interface circuit 136, an exchange circuit 138, an MBC partner transaction circuit 144, a fiat reserve 140, and an overlay ledger 146. The network interface 122 is structured to facilitate operative communication between the MBC partner computing system 104 and other systems and devices via the network 110. The network interface 122 is also structured to facilitate operative communication between the MBC partner computing system 104 and the third-party MBC wallet management computing system 106 via the MBC network 112. The MBC partner computing system 104 may, for example, include one or more servers each with one or more processors configured to execute instructions stored in a memory, send and receive data stored in the memory, and perform other operations to implement the financial services described herein associated with the processing modules, databases, and processes shown.

The exchange circuit 138 is structured to receive an exchange rate request for a current exchange rate between fiat currency and MBC from the financial institution computing system 102, and return the current exchange rate to the financial institution computing system 102. In some embodiments, the exchange rate circuit is accessed twice during a transaction, first during the initial prompt for customer approval and second after receiving a customer approval for the transaction, checking to make sure there was not a substantial change in the market exchange rate between the two instances. If the second exchange rate is not within a predetermined threshold of the first exchange rate, then the exchange rate circuit sends a command to cancel the transaction and submits the second exchange rate to be used for the new customer approval request. In some embodiments, the exchange rate circuit 138 is structured to calculate an amount of MBC equivalent to a specific amount of fiat currency and then return those values to the financial institution computing system 102.

The MBC partner transaction circuit 144 is structured to process transactions between the MBC partner and third-party MBC wallets on the MBC network 112. The MBC partner transaction circuit 144 is in communication with and receives commands from the MBC transaction circuit 124. When a deposit service is being provided, the MBC partner transaction circuit 144 receives commands relating to generating an account alias and exchanging the MBC in the account to fiat currency. Upon receiving a generation request, the MBC partner transaction circuit 144 generates an account alias 150 for the financial institution to use to accept MBC deposits for its customers. Once funds are deposited into the generated account alias 150, the MBC partner transaction circuit 144 pings the financial institution computing system 102 with the deposit amount and the deposit location (i.e. the account alias). Upon receiving a deposit conversion request, the MBC partner transaction circuit 144 will determine whether to access an exchange market to purchase fiat currency with the entire amount of MBC held in the account, or to exchange the MBC using the fiat reserve 140. If the MBC partner transaction circuit 144 determines to access the exchange market, the MBC funds in the account alias 150 will be sent to the address provided by the exchange and fiat funds will be received and subsequently sent to the financial institution computing system 102. If the MBC partner transaction circuit 144 decides to access the fiat reserve 140 the fiat funds are removed from the reserve and sent to the financial institution computing system 102, and the MBC in the account alias 150 is unassigned in the overlay ledger 146 and can be used in other transaction sending MBC.

When a sending MBC service is being provided, the MBC partner transaction circuit 144 will receive commands relating to generating an account alias 150 and exchanging the fiat currency in the requesting customer's account into MBC. Upon receiving a generation request, the MBC partner transaction circuit 144 generates an account alias as a holding account alias 150 for the MBC funds. The generated account alias can be the MBC address or a public key to receive the MBC from the exchange and a private key, linked to the customer that can be used to send MBC to a third party. Upon receiving a sending conversion request, the MBC partner transaction circuit 144 will determine whether to access an exchange market to purchase the MBC or to use unassigned MBC in the overlay ledger to complete the transaction. If the MBC partner transaction circuit 144 determines to access the exchange market, the fiat funds in the fiat reserve 140 will be sent to the address provided by the exchange and MBC will be received using the generated public key in the holding account alias 150. If the MBC partner transaction circuit 144 decides to access the unassigned MBC in the overlay ledger 146 the unassigned MBC is assigned to the holding account alias 150. Once funds are deposited into the holding account alias 150, the MBC partner transaction circuit 144 sends the MBC in the holding account alias 150 to the MBC address for the third-party over the MBC network 112.

The fiat reserve 140 includes fiat funds provided by the financial institution that can be used to purchase MBC. The fiat reserve 140 includes fiat currency funds that allow the MBC partner to facilitate transactions in real-time. In some embodiments, the financial institution holds a reserve of fiat currency with the MBC partner, eliminating the time it would take to send the fiat currency funds to purchase the MBC from the financial institution to the MBC partner. In other embodiments, the fiat reserve fund 140 is accessible by the MBC partner to buy MBC on the exchange, but the actual account is held in an account at the financial institution.

The overlay ledger 146 is structured to manage the MBC deposited to the customers of the financial institution. The overlay ledger 146 provides a record of association for the MBC within the pooled MBC account 148. The overlay ledger 146 associates an individual customer or account alias with a designated amount of MBC transferred to the MBC partner. The overlay ledger 146 may be stored in a database and each account for customers may be associated with a single entry in the database. The same or additional ledgering systems may be used to track transactions for each the specific MBC accounts. The pooled MBC account 148 is a database of addresses, private keys, and public keys associated with MBC that has been transferred to the MBC partner. Through the pooled MBC account 148, the MBC partner maintains the MBC from customers 104 received during deposit transactions. Additionally, the MBC partner initiates transfers of MBC to designated recipients during a transaction request. The MBC partner maintains the contents of the pooled MBC account 148 in secrecy such that entities and people outside of the financial institution and the MBC partner do not have knowledge of the addresses, private keys. In some arrangements, the MBC partner computing system 104 may maintain a plurality of pooled MBC accounts (i.e., a plurality of separate databases) containing MBC of a plurality of customers. In one embodiment, the MBC stored in the pooled MBC account 148 may be significantly less than the total amount of MBC received in the form of deposits and may not be associated with any particular customer.

The MBC network 112 holds an open leger of the MBC transactions and encapsulates all the rules regarding the MBC being transferred and recorded on the network. For example, the MBC may have an open ledger in a block chain that is shared between all entities on the network. The purchase or sale of the MBC by the MBC partner on an MBC exchange is documented on the MBC network 112. In some embodiments, the use of the MBC network 112 may incur transaction fees that may be collected by the MBC partner or the financial institution to facilitate the transaction for the customer.

The third-party MBC wallet management computing system 106 manages MBC accounts (e.g., MBC wallets) for various third-party individuals and entities that may conduct MBC transactions with the customer of the financial institution computing system 102. The third-party MBC wallet management computing system 106 includes a network interface circuit 152 and a transaction circuit 154. The network interface circuit 152 is structured to facilitate operative communication between the third-party MBC wallet management computing system 106 and other systems and devices over each of the network 110 and the MBC network 112. The transaction circuit 154 facilitates MBC transactions between third-party account holders of the third-party MBC wallet management computing system 106 and customers of the financial institution computing system 102.

The customer computing systems 108 include a network interface circuit 114, a display 116, an input/output device 118, and a client application 120. The network interface 114 is structured to facilitate operative communication between the customer computing systems 108 and other systems and devices over the network 110. The customer computing systems 108 may include smartphones, tablet computing systems, laptop computing systems, desktop computing systems, PDAs, smart watches, smart glasses, tablets, etc.

The display 116 is structured to present account information, transaction information, and the like, to customers. The input/output device 118 is structured to receive input from the customer via the customer computing systems 108. The input/output may relate to MBC deposit requests, MBC transaction requests, personal information, and other information used to facilitate transactions between the financial institution, the customers, and the MBC partner. The input/output device can be used by the customer to provide straight-forward transaction details (e.g., recipient, transaction amount in fiat currency or MBC, etc.) to be carried out by the financial institution computing system 102. The input/output device 118 may include a keyboard, a mouse, a touchscreen, a biometric sensor (e.g., a fingerprint sensor), a microphone, a camera, etc.

The client application 120 is structured to provide the customer with an easy to use interface to accept pending MBC deposits or to send an MBC of some kind, to some destination. The client application 120 may comprise program logic (e.g., stored executable instructions) structured to implement at least some of the functions described herein. The client application 120 may simply be a web browser (e.g., Safari®, Chrome®, Internet Explorer®, etc.) configured to receive and display web pages received from the financial institution computing system 102. For example, the customer may log into his or her existing financial institution account and select an account details option to establish a near real-time MBC transaction service, generating an account alias for receipt of MBC and taking in inputs to specify how many dollars he or she wants to send or, alternatively, the amount of MBC he or she wants to send. In other arrangements, the client application 120 may include a dedicated application (e.g., a smartphone application), a text message interface, or another program suitable for communicating with the financial institution computing system 102 over the network 110 in order to facilitate the customers' ability to transfer MBC to an intended recipient. The client application 120 can also provide the customer with all generated account aliases and transaction details.

In order to make the client application 120, the financial institution computing system 102 may provide a software application and make the software application available to be placed on the customer computing system 108. For example, the financial institution computing system may make the software application available to be downloaded (e.g., via the online banking website of the bank, via an app store, or in another manner). Responsive to a user selection of an appropriate link, the client application 120 for transferring and receiving MBC through the fiat customer deposit account with the connection to the financial institution computing system 102 may be transmitted to the customer computing system 108 and may cause itself to be installed on the customer computing system 108. Installation of the software application creates the client application on the customer computing system 108. Specifically, after installation, the thus-modified customer computing system 108 includes the client application 120 for transferring and receiving MBC through the fiat customer deposit account (embodied as a processor and instructions stored in non-transitory memory that are executed by the processor).

Figure 2:
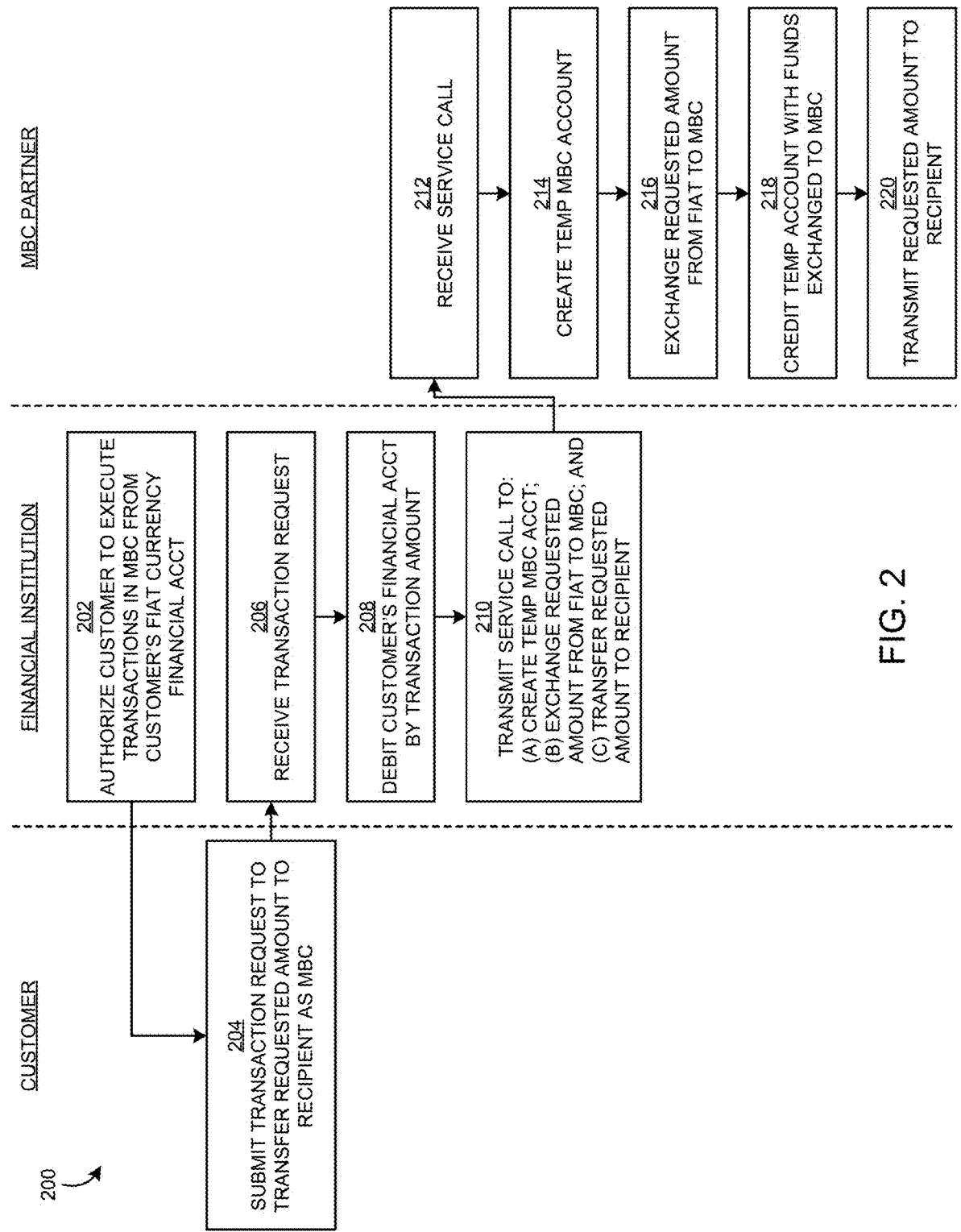
FIG. 2 is a flow diagram of a method of transmitting MBC from a fiat currency account, according to an example embodiment.

Referring to FIG. 2 a flow diagram of a method 200 of transmitting MBC from a fiat currency account is shown, according to an embodiment. The method 200 is shown in connection with a customer, a financial institution, and an MBC partner. For example, the customer may be an individual who operates the customer computing system 108 of FIG. 1. The financial institution may be a financial institution that manages the financial institution computing system 102 of FIG. 1. The MBC partner may be an entity that manages the MBC partner computing system 104 of FIG. 1. However, the method 200 may be similarly performed by other systems and devices.

At 202, a customer is authorized to execute MBC transactions from the customer's fiat currency financial account. In some embodiments, all account holders of a financial institution are authorized to execute MBC transactions. However, in other embodiments, account holders must opt-in to MBC transaction services, and must be approved by the financial institution to execute MBC transactions.

At 204, a transaction request is transmitted from the customer to the financial institution. The transaction request may include various details defining the parameters of an MBC transaction. For example, the transaction request may include an amount, a recipient, an MBC type, etc. The amount may be defined in the fiat currency of the financial account, or in a selected MBC. For example, the customer could request to send 100 U.S. dollars in MBC to a desired recipient. Alternatively, the customer could request to send 5 MBC coins to a desired recipient. In some embodiments, the financial institution maintains a directory that lists MBC wallet addresses with identifiers associated with the respective addresses, such as the MBC wallet owner's name, email address, phone number, etc. Accordingly, the customer may simply enter the desired recipient's name, email address, etc., instead of the recipient's MBC wallet address.

At 206, the financial institution receives the transaction request from the customer. In some arrangements, the request is transmitted from the customer computing system 108 and is received by the financial institution. In other arrangements, the request is initiated by an employee of the financial institution entering data into a computing system (e.g., an employee terminal connected to the server of the financial institution) during a person-to-person interaction. For example, the customer may walk into a branch location of the financial institution and initiate the deposit request via interaction with a teller at the branch. In some embodiments, after receiving the request, the financial institution determines if the requesting customer is registered with the financial institution and authorized to execute MBC transactions. If the requestor is not registered, the financial institution may register and/or authorize the customer or deny the transaction request. In some embodiments, as discussed further in connection with FIG. 3, the financial institution may validate the transaction prior to executing the transaction.

At 208, the financial institution debits the customer's financial account by a transaction amount. The transaction amount may include the requested amount to be transmitted to the recipient, and may also include fees associated with the transaction. Fees may be associated with one or both of the financial institution and the MBC partner. If the requested amount defined in the transaction request is provided as MBC, the financial institution may determine the amount of fiat currency equivalent to the requested amount of MBC to determine the transaction amount.

At 210, the financial institution transmits a service call to the MBC partner to conduct the transaction. The service call may include several instructions. In one embodiment, the service call includes instructions to create a temporary MBC account (e.g., MBC wallet address) on behalf of the customer. The temporary MBC account may be used to temporarily hold the MBC funds to be sent on behalf of the customer. The service call may also include instructions to exchange (e.g., purchase via an MBC exchange) the requested amount from fiat currency to MBC. The service call may further include instructions to transmit the requested amount to the recipient.

At 212, the MBC partner receives the service call. Upon receiving the service call, the MBC partner initiates a series of MBC transaction steps. At 214, the MBC partner creates a new temporary MBC account (e.g., MBC wallet address) to hold the soon-to-be purchased MBC funds.

At 216, the MBC partner exchanges the requested amount of fiat currency to MBC. In some embodiments, the financial institution maintains a reserve account in fiat currency at the MBC partner, and the funds are exchanged from the financial institution's account. In other embodiments, the MBC partner maintains a reserve of fiat currency, and the funds are exchanged from the MBC partner's reserve. In other embodiments, the fiat funds are transferred from the customer's account with the financial institution to the MBC partner, and the transferred funds are exchanged. In some embodiments, the MBC partner may maintain an inventory of both fiat currency and MBC to facilitate transactions when there is a flurry of requests or exchange market fluctuations. The MBC partner may determine if there is enough currency in the inventory to perform the trade without performing the exchange on the market.

At 218, the temporary account is credited with the funds exchanged to MBC. At 220, the requested amount is transmitted to the recipient in the form of MBC. In some embodiments, the MBC partner transmits a transaction confirmation message to the financial institution. The financial institution may subsequently transmit the transaction confirmation and an account update to the customer. The customer may receive the transaction confirmation the next time he or she logs into his or her account, or it may be retrieved instantaneously through push notifications tied to the financial institution. Accordingly, the method 200 facilitates an MBC transaction to transfer funds in MBC from the customer's fiat financial account.

Figure 3:
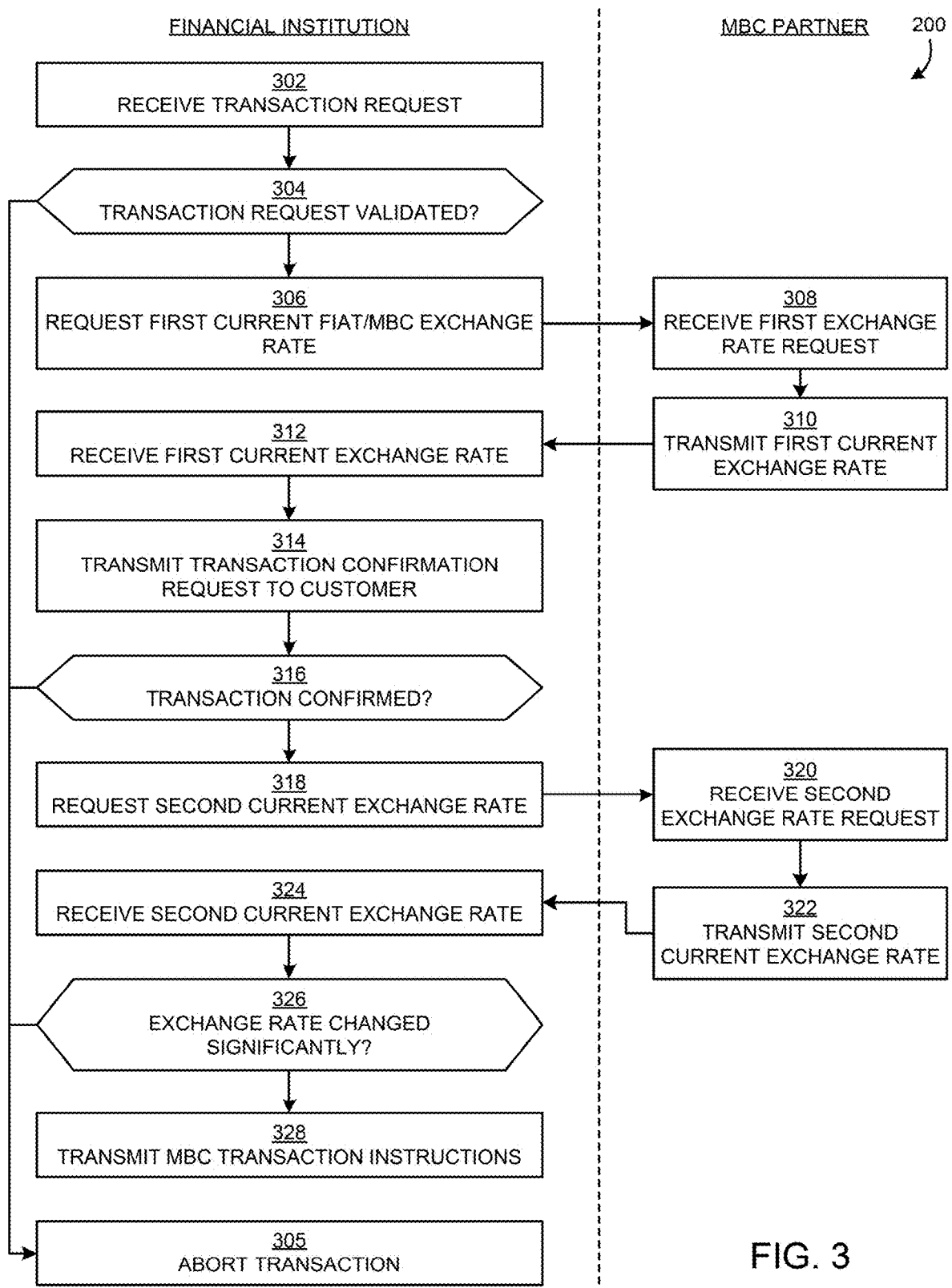
FIG. 3 is a flow diagram of validating an MBC transaction, according to an example embodiment.

Referring to FIG. 3, a method 300 of validating an MBC transaction is shown, according to an embodiment. The method 300 may be performed in connection with the method 200 of FIG. 2. However, the method 300 may similarly be performed in connection with other types of transactions. The method 300 is shown in connection with a financial institution and an MBC partner. For example, the financial institution may be a financial institution that manages the financial institution computing system 102 of FIG. 1. The MBC partner may be an entity that manages the MBC partner computing system 104 of FIG. 1. However, the method 300 may be similarly performed by other systems and devices.

At 302, a transaction request is received by the financial institution from a customer (not shown). As described above in connection with step 204 of the method 200 of FIG. 2, the transaction request may include various details defining the parameters of an MBC transaction. For example, the transaction request may include an amount, a recipient, an MBC type, etc.

At 304, the transaction request is validated. In order to validate the transaction request, the financial institution may perform several regulatory and compliance checks. For example, the financial institution may verify that the customer is authorized to conduct MBC transactions. The financial institution may also verify that the customer has not exceeded his or her cash withdrawal limits for the period, that the user has the available funds for withdrawal from his or her financial account, that the customer has not been flagged by the financial institution as sensitive, etc. If the transaction request is not validated, the transaction is aborted at 305.

Upon validating the transaction request, at 306, the financial institution requests a first current exchange rate between fiat currency and the MBC specified in the transaction request. The financial institution transmits the exchange rate request to the MBC partner. In some embodiments, the financial institution establishes a real-time or near real-time communication channel with the MBC partner.

At 308, the MBC partner receives the exchange rate request. At 310, the MBC partner transmits the first current exchange rate to the financial institution.

At 312, the financial institution receives the first current exchange rate. The financial institution uses the first current exchange rate to calculate certain parameters associated with the transaction request. As mentioned above, the transaction request may define the amount to be sent in either fiat currency or in MBC. If the requested amount is defined in MBC, the financial institution may utilize the exchange rate to determine the amount in fiat currency that will be debited from the customer's account. Conversely, if the requested amount is defined in dollars, the financial institution may utilize the exchange rate to determine the amount in MBC that will be transmitted to the recipient.

At 314, a transaction confirmation request is transmitted to the customer. The transaction confirmation request may include relevant transaction details, such as the type of MBC to be sent, the amount of MBC that will be sent and the corresponding amount of fiat currency, the receiver address, fees, etc. The customer can confirm or deny the transaction request, or can edit the parameters of the transaction request.

At 316, the financial institution receives the response to the transaction confirmation request from the customer and determines whether or not the customer confirmed the transaction request. If the transaction confirmation request is denied, the transaction is aborted at 305. If the transaction request was confirmed, a second current exchange rate is requested at 318. At 320, the MBC partner receives the second exchange rate request. At 322, the MBC partner transmits the second current exchange rate. At 324, the financial institution receives the second current exchange rate.

At 326, the financial institution determines if the exchange rate has changed significantly. For example, the financial institution may compare the first current exchange rate to the second current exchange rate to determine if the two exchange rates are within a predetermined threshold of each other. The predetermined threshold may be any value set by the financial institution. For example, in some embodiments, the predetermined threshold is one percent. In other embodiments, the predetermined threshold is ten percent. If the exchange rate has changed significantly, the transaction is aborted at 305.

At 328, MBC transaction instructions are transmitted by the financial institution to the MBC partner if the exchange rate has not changed significantly. For example, the transaction instructions may be transmitted in a service call, such as in step 210 of the method 200 of FIG. 2.

Figure 4:
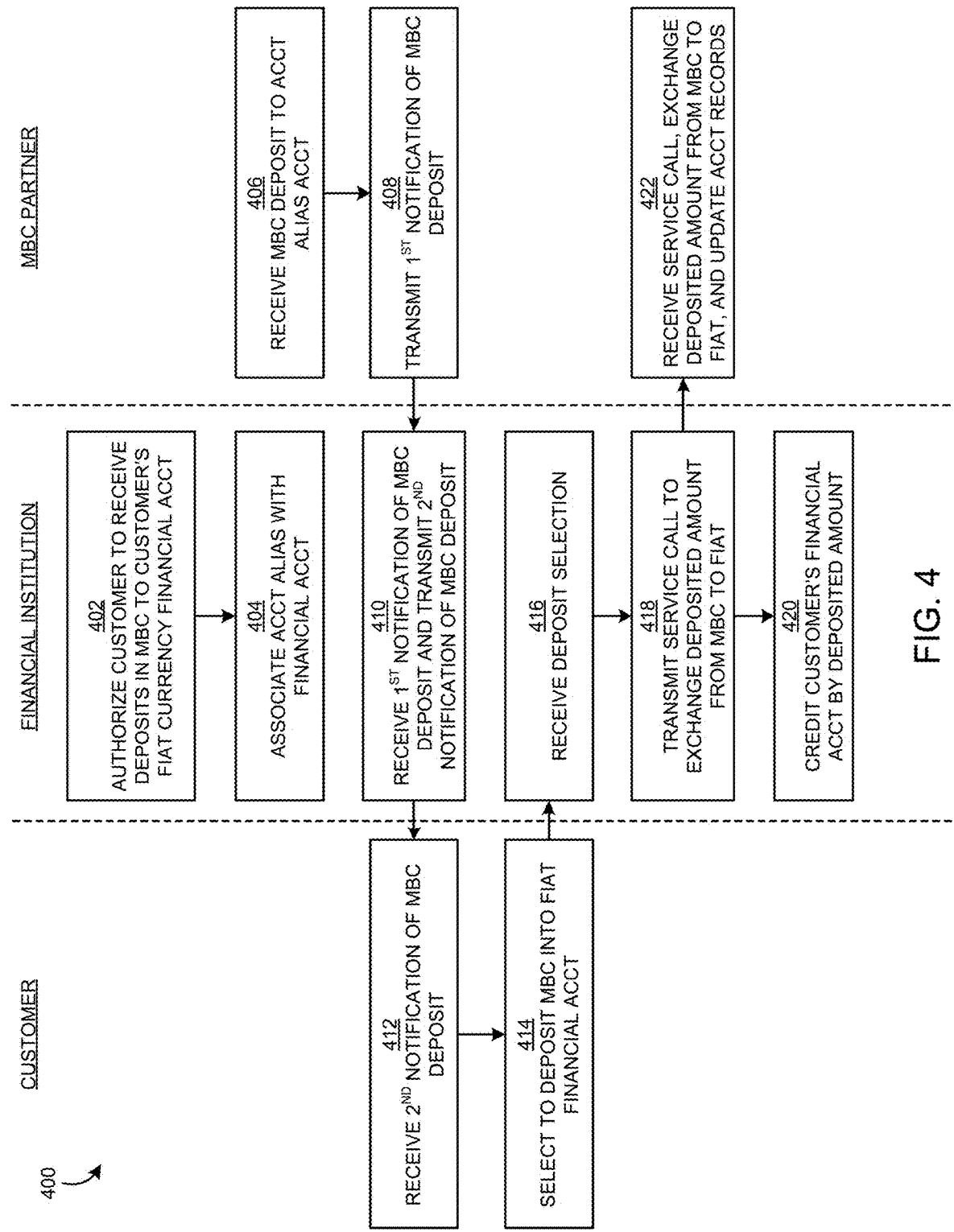
FIG. 4 is a flow diagram of a method of receiving MBC and depositing the received MBC as fiat currency in a customer's fiat currency account.

Referring to FIG. 4, a flow diagram of a method 400 of receiving MBC and depositing the received MBC as fiat currency in the customer's fiat currency financial account is shown, according to an example embodiment. The method 400 is shown in connection with a customer, a financial institution, and an MBC partner. For example, the customer may be an individual who operates the customer computing system 108 of FIG. 1. The financial institution may be a financial institution that manages the financial institution computing system 102 of FIG. 1. The MBC partner may be an entity that manages the MBC partner computing system 104 of FIG. 1. However, the method 400 may be similarly performed by other systems and devices.

At 402, a customer is authorized to receive deposits in MBC into the customer's fiat currency financial account. In some embodiments, all account holders of a financial institution are authorized to execute MBC transactions. However, in other embodiments, account holders must opt-in to MBC transaction services, and must be approved by the financial institution to execute MBC transactions, such as receiving MBC deposits.

At 404, the financial institution associates an account alias with the customer's financial account. The account alias is an address to which MBC funds may be sent. In one embodiment, the financial institution transmits instructions to the MBC partner to create an MBC wallet for the account holder. The account alias may be MBC wallet address or a pointer to the MBC wallet address. For example, in one embodiment, the account alias is a hash of the public key associated with the MBC wallet. In another embodiment, the account alias is a pointer, such as an email address, username, link, etc., associated with the MBC wallet address. In some embodiments, the financial account maintains a database that links customers' financial accounts, MBC wallet addresses, account aliases, etc. Upon associating the account alias with the financial account, the customer can provide the account alias to other users so that the users may transmit MBC to the customer's financial account via the account alias.

At 406, the MBC partner receives an MBC deposit to the MBC wallet corresponding to the account alias. The MBC partner may also maintain a database that links certain account aliases to MBC wallets and to financial institutions and corresponding fiat financial account numbers. Accordingly, upon receiving the MBC deposit to the MBC wallet corresponding to the account alias, the MBC partner determines that a notification of the MBC deposit is to be transmitted to the financial institution.

At 408, the MBC partner transmits a first notification to the financial institution that an MBC deposit was made into the MBC wallet corresponding to the account alias. In some embodiments, the first notification also includes a first current exchange rate between fiat currency and MBC.

At 410, the financial institution receives the first notification that the MBC deposit was made into the MBC wallet corresponding to the account alias. The financial institution then prepares a second notification of the MBC deposit, and transmits the second notification to the customer. The second notification may include details of the deposit, such as the type of MBC, the deposited amount in MBC and fiat currency, the current fiat currency/MBC exchange rate, fees associated with the deposit, and financial accounts to which the MBC may be deposited. The second notification also includes a request to approve, deny, or hold the deposit.

At 412, the customer receives the second notification of the MBC deposit from the financial institution. Upon receiving the second notification of the MBC deposit, the customer review the terms of the deposit, and approve, deny, or hold the pending deposit. At 414, the customer's selection is transmitted to the financial institution.

At 416, the financial institution receives the deposit selection from the customer. Upon receiving the deposit selection, the financial institution may validate the deposit prior to ultimately causing the funds to be deposited. For example, in one embodiment, the method 300 of FIG. 3, or portions thereof, may generally be used to validate the deposit. In order to validate the deposit, the financial institution may perform several regulatory and compliance checks, and ensure that the fiat currency/MBC exchange rate has not changed significantly.

At 418, the financial institution transmits a service call to the MBC partner. The service call includes instructions to exchange the deposited amount from MBC to fiat currency. At 420, the financial institution credits the customer's financial account by the deposited amount.

At 422, the MBC partner receives the service call from the financial institution and exchanges the MBC amount in the account alias into fiat currency. The MBC partner also updates account records. In some embodiments, the MBC partner transmits a deposit confirmation to the financial institution. In some embodiments, the MBC partner transmits the exchanged fiat currency funds to the financial institution. However, in other embodiments, the MBC partner and the financial institution record the transaction and settle at a later time.

Figure 5A:
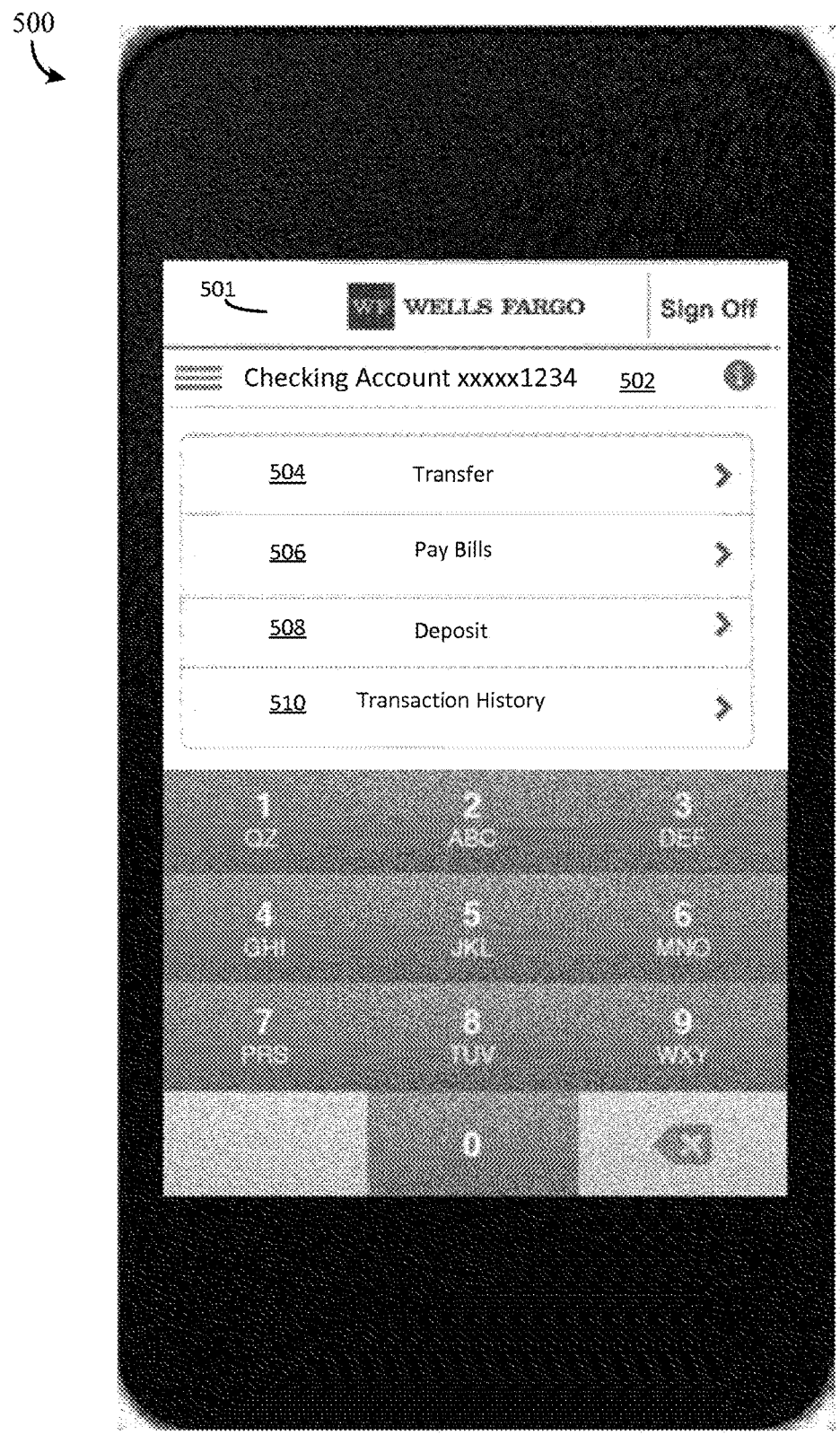
FIGS. 5A-5C illustrate display screens that may be displayed the user during the process of FIG. 2 and FIG. 4.
Figure 5B:
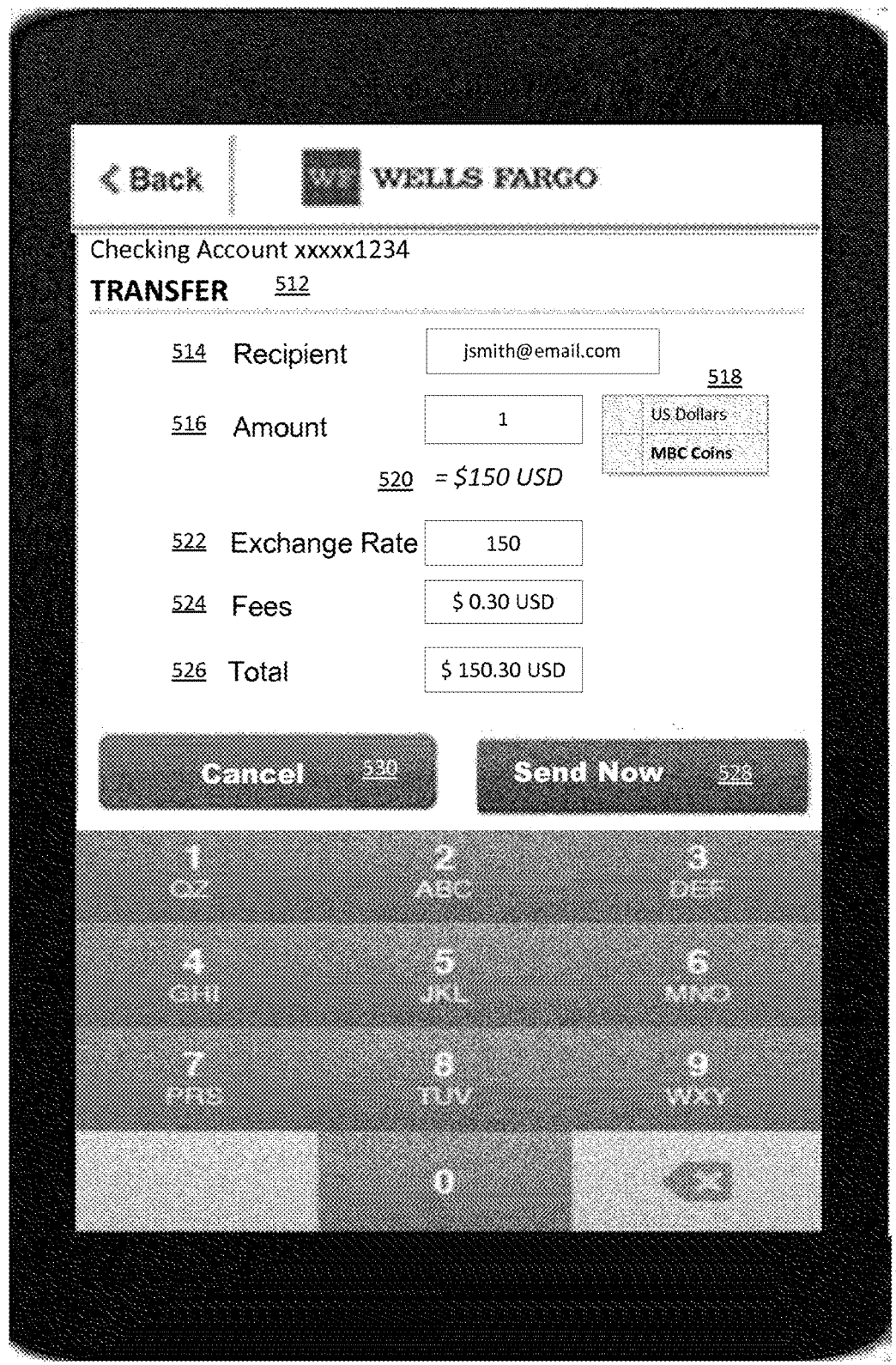
Figure 5C:
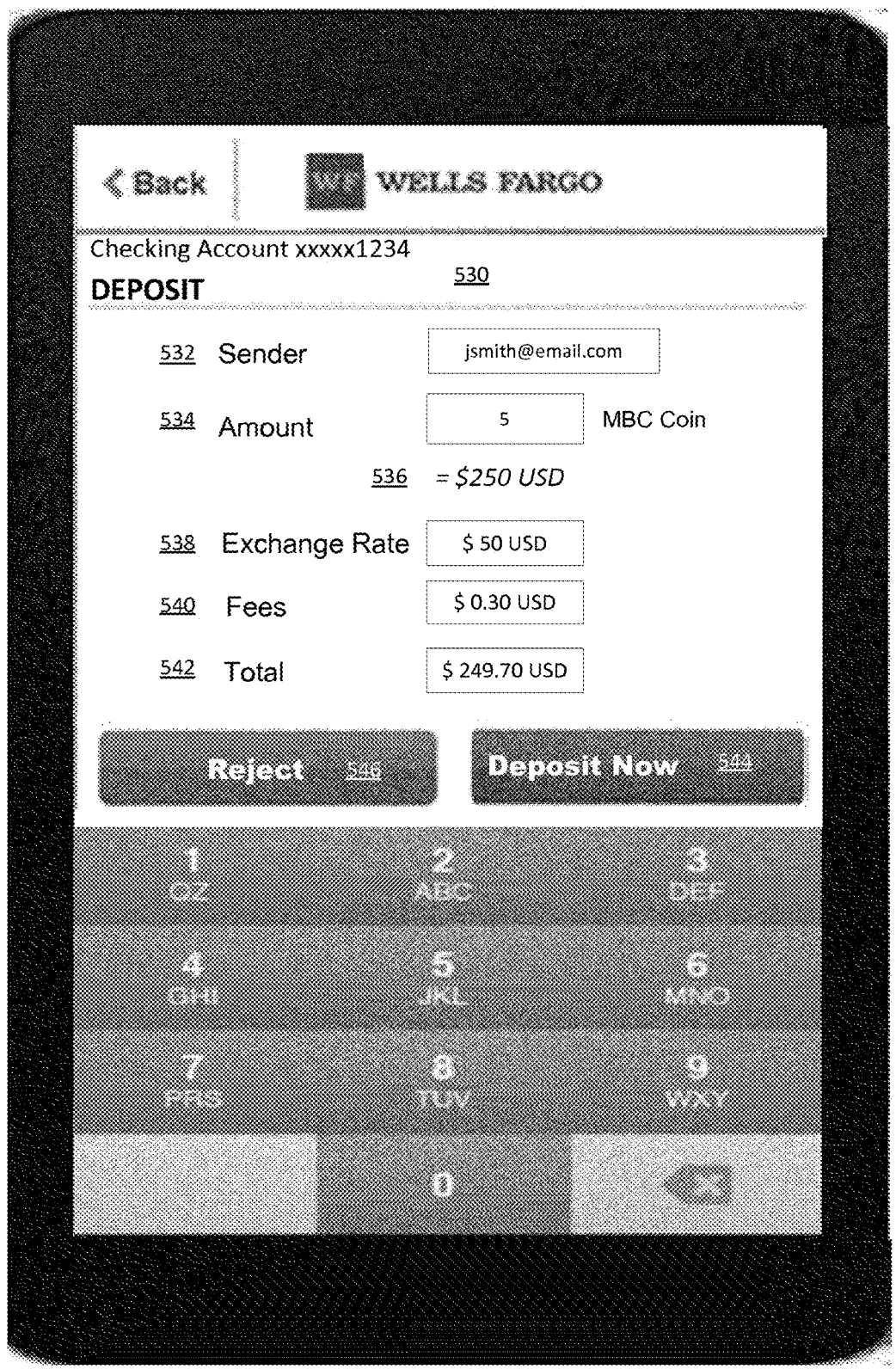

FIGS. 5A-5C illustrate an example graphical user interface ("GUI") 500 that may be utilized to send and receive MBC from a fiat currency account, according to an example embodiment. For example, the GUI 500 may be displayed to the customer via the customer computing system 108 of FIG. 1. The GUI 500 may be utilized in connection with the method 200 of FIG. 2 and the method 400 of FIG. 4, according to example embodiments. For example, the customer may utilize the GUI 500 to send MBC to a third party, via method 200. As another example, the customer may utilize the GUI 500 to receive an MBC deposit into their fiat currency account from a third party, via method 400. However, it should be understood that the GUI 500 may similarly be utilized on other devices to conduct other types of MBC transactions.

FIG. 5A illustrates a menu page 501 of the GUI 500, according to an embodiment. The GUI 500 includes a mobile banking interface that may be displayed to the customer after accessing the client application 120 that has been installed on the customer computer system 108. In another embodiment, the GUI 500 may similarly be accessed via an online banking website. Upon accessing the GUI 500, the customer is prompted to provide login credentials to gain access to the account with the financial institution. By providing such credentials, the customer may be provided with the full functionality of the online banking system in the client application. In an example embodiment, the menu page 501 includes a plurality of menu option for the customer's specific fiat currency financial account 502. In this example, the customer is authorized to execute MBC transactions from the customer's fiat currency financial account. The menu page 501 includes several menu buttons labeled with a corresponding action. For example the menu buttons may include a transfer button 504, a pay bills button 506, a deposit button 508, and a transaction history 510 button.

Referring now to FIG. 5B, a transfer funds page 512 of the GUI 500 of FIG. 5A is illustrated. For example, the transfer funds page 512 may be displayed in response to a customer selection of the transfer button 504 on the menu bar provided in FIG. 5A. The transfer funds page 512 provides the customer a plurality of fields to easily facilitate sending MBC to a recipient. According to an embodiment, the transfer funds page 512 includes a recipient field 514, an amount field 516, a currency field 518, an equivalent amount field 520, an exchange rate field 522, a fees field 524, and a transaction amount field 526. The recipient field 514 defines the identifier or address of the recipient 514 to which MBC will be sent. This could be, for example, an email address or phone number of the third-party recipient. The amount field 516 defines the amount of funds the customer would like to transmit to the third-party recipient. The currency field 518 defines the currency that the funds will be transmitted as. For example, the customer may enter a value in the amount field 516 and select the corresponding currency type in a the currency field 518, which may be a drop-down selection menu. For example, the customer could request to send 100 U.S. dollars to a desired recipient or alternatively as shown in FIG. 5B, the customer could request to send 1 MBC coin to a desired recipient, "jsmith@email.com."

The equivalent amount field 520 of the GUI 500 may display, in real-time, an amount in a non-selected currency that is equivalent to the amount requested by the customer via the amount field 516. One of the amount field 516 and the equivalent amount field 520 is defined in the customer's primary fiat currency (e.g., U.S. dollars). For example, as shown in FIG. 5B, if the requested amount defined in the amount field 516 is provided as MBC coins. Accordingly, the equivalent amount field 520 of the GUI 500 displays the amount of fiat currency equivalent to the requested amount of MBC coins. Alternatively, if the requested amount defined in the amount field 516 is provided as fiat currency, the equivalent amount field 520 of the GUI 500 displays the amount of MBC coins equivalent to the requested amount of fiat currency. The exchange rate field 522 of the GUI 500 displays the current exchange rate between the fiat currency and the currency defined in the currency field 518. For example, the current exchange rate may be provided by the exchange circuit 138. The fees field 524 of the GUI 500 displays fees associated with the transaction. The fees may be associated with one or both of the financial institution and the MBC partner. The transaction amount field 526 is the total transaction amount in fiat currency that the customer's account will be debited upon executing the transaction. The total transaction amount may include the requested amount to be transmitted to the recipient, and may also include fees associated with the transaction. The customer may choose to approve the transaction displayed by selecting the "Send Now" button 528, or the customer may cancel the transaction request via the "Cancel" button 530. In some embodiments, either selection may lead to an additional confirmation prompt by the application.

Referring now to FIG. 5C, a deposit MBC page 530 of the GUI 500 of FIGS. 5A and 5B is illustrated. For example, the deposit funds page 530 may be displayed in response to a customer selection of the deposit button 508 of the menu page 501 of FIG. 5A. The deposit funds page 530 provides the customer a plurality of information and a plurality of inputs to easily facilitate accepting or rejecting an MBC deposit to the customer. According to an example embodiment, the deposit funds page 530 includes a sender field 532, an amount field 534, an equivalent amount field 536, an exchange rate field 538, a fees field 540, and a deposit amount field 542. The sender field 532 defines the identifier or address of the third-party sender 532 of the MBC. This could be, for example, an email address or phone number of the third-party sender. The amount field 534 defines the amount of MBC funds that have been deposited in the customer's temporary MBC account (e.g., corresponding to the account alias). For example, the amount field 534 may display a value and an MBC type for each pending deposit request. For example, as shown in FIG. 5C, the deposit MBC page 530 of the GUI 500 displays that the MBC currency type was MBC coin, that it was sent to the customer's temporary MBC account by 'jsmith@email.com" and that the value was 5 MBC coins.

The equivalent amount field 536 of the GUI 500 may display, in real-time, an amount in the customer's primary fiat currency (e.g., U.S. dollars) that is equivalent to the amount of MBC deposited in the customer's account alias by the third-party sender. For example, as shown in FIG. 5C, if the deposited amount defined in the amount field 534 is provided as MBC coins, the equivalent amount field 536 of the GUI 500 displays the amount of fiat currency equivalent to the deposited amount of MBC coins. The exchange rate field 538 of the GUI 500 displays the current exchange rate between the fiat currency and the MBC type of the amount defined in the amount field 534. For example, the current exchange rate may be provided by the exchange circuit 138. The fees field 540 of the GUI 500 displays fees associated with the transaction. The fees may be associated with one or both of the financial institution and the MBC partner. The deposit amount field 542 is the total deposit amount in fiat currency that the customer's account will be credited upon executing the deposit. The total deposit amount field 542 may include the deposited amount pending in the customer's account alias and may also include fees associated with the deposit. The customer may choose to approve the deposit displayed by selecting the "Deposit Now" button 544, or the customer may reject the current deposit by selecting the "Reject" button 546. In some embodiments, either selection may lead to an additional confirmation prompt by the application.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method, comprising:
debiting, by a processor of a financial institution computing system in response to a transaction request to transfer a first amount of funds denominated in a math-based currency (MBC) from a financial account denominated in a fiat currency and assigned to an account holder, the financial account by a second amount of funds denominated in a fiat currency and equivalent to the first amount of funds denominated in MBC, based on a first current exchange rate between fiat currency and MBC;
transmitting, concurrently with the debiting, by the processor to an MBC partner, a request for the first current exchange rate;
transmitting, concurrently with the debiting, by the processor to the MBC partner, instructions to:
create a temporary account at the MBC partner denominated in MBC, the temporary account associated with the financial institution and separate from the financial account associated with the account holder,
exchange, from fiat currency at a reserve account provided by and assigned to the financial institution computing system and denominated in the fiat currency, the second amount of funds to MBC currency at the MBC partner, credit the temporary account with funds from the MBC partner comprising the first amount, and
transfer the first amount of funds in MBC from the temporary account to the recipient;
receiving, by the processor from the account holder, a confirmation in response to a transaction confirmation request;
transmitting, by the processor to the MBC partner in response to receiving the transaction confirmation request, a request for a second current exchange rate between the fiat currency and the MBC; and
verifying, by the processor, that the second current exchange rate is within a predetermined threshold of a first current exchange rate, wherein the financial account is debited in response to the verifying that the second current exchange rate is within the predetermined threshold of the first current exchange rate.

2. The method of claim 1, further comprising:
transmitting, by the processor to the MBC partner in response to receiving the transaction request, a request for a first current exchange rate between the fiat currency and the MBC, wherein the second amount is determined based on the first current exchange rate.

3. The method of claim 2, the transaction confirmation request including an indication of at least one of the first amount in the MBC, the second amount in the fiat currency, and fees associated with the transaction.

4. The method of claim 3, further comprising:
receiving, by the processor from the account holder, a confirmation in response to the transaction confirmation request;
transmitting, by the processor to the MBC partner in response to receiving the confirmation, a request for a second current exchange rate between the fiat currency and the MBC; and
verifying, by the processor, that the second current exchange rate is within a predetermined threshold of the first exchange rate, wherein the financial account is debited in response to the verifying that the second current exchange rate is within the predetermined threshold of the first current exchange rate.

5. The method of claim 3, further comprising:
validating, by the processor prior to transmitting the transaction confirmation request, the transaction request,
wherein validating the transaction request includes determining that the financial account includes at least a transaction amount including the second amount of the fiat currency and the fees associated with the transaction.

6. The method of claim 5, wherein the fees associated with the transaction include fees associated with each of the financial institution and the MBC partner.

7. The method of claim 6, further comprising:
transmitting, by the processor to the MBC partner, the fees associated with the MBC partner.

8. The method of claim 7, further comprising:
debiting, by the processor, the financial account by the fees associated with the MBC partner.

9. The method of claim 1, wherein the MBC partner comprises the financial institution.

10. A system, comprising:
a financial institution computing system to:
debit, in response to a transaction request to transfer a first amount of funds denominated in a math-based currency (MBC) from a financial account denominated in a fiat currency and assigned to an account holder, the financial account by a second amount of funds denominated in a fiat currency and equivalent to the first amount of funds denominated in MBC, based on a first current exchange rate between fiat currency and MBC;
transmit, concurrently with the debiting, to an MBC partner, a request for the first current exchange rate;
transmit, concurrently with the debiting, to the MBC partner, instructions to:
create a temporary account at the MBC partner denominated in MBC, the temporary account associated with the financial institution and separate from the financial account associated with the account holder,
exchange, from fiat currency at a reserve account provided by and assigned to the financial institution computing system and denominated in the fiat currency, the second amount of funds to MBC currency at the MBC partner, credit the temporary account with funds from the MBC partner comprising the first amount, and
transfer the first amount of funds in MBC from the temporary account to the recipient;
receive, from the account holder, a confirmation in response to a transaction confirmation request;
transmit, to the MBC partner in response to receiving the transaction confirmation request, a request for a second current exchange rate between the fiat currency and the MBC; and
verify that the second current exchange rate is within a predetermined threshold of a first current exchange rate, wherein the financial account is debited in response to the verifying that the second current exchange rate is within the predetermined threshold of the first current exchange rate.

11. The system of claim 10, the financial institution computing system to:
transmit, to the MBC partner in response to receiving the transaction request, a request for a first current exchange rate between the fiat currency and the MBC, wherein the second amount is determined based on the first current exchange rate.

12. The system of claim 11, the transaction confirmation request including an indication of at least one of the first amount in the MBC, the second amount in the fiat currency, and fees associated with the transaction.

13. The system of claim 12, the financial institution computing system to:
receive, from the account holder, a confirmation in response to the transaction confirmation request;
transmit, to the MBC partner in response to receiving the confirmation, a request for a second current exchange rate between the fiat currency and the MBC; and
verify that the second current exchange rate is within a predetermined threshold of the first exchange rate,
wherein the financial account is debited in response to the verifying that the second current exchange rate is within the predetermined threshold of the first current exchange rate.

14. The system of claim 12, the financial institution computing system to:
validate, prior to transmitting the transaction confirmation request, the transaction request,
wherein validating the request includes determining that the financial account includes at least a transaction amount including the second amount of the fiat currency and the fees associated with the transaction.

15. The system of claim 14, wherein the fees associated with the transaction include fees associated with each of the financial institution and the MBC partner.

16. The system of claim 15, the financial institution computing system to:
transmitting, to the MBC partner, the fees associated with the MBC partner.

17. The system of claim 16, the financial institution computing system to:
debiting the financial account by the fees associated with the MBC partner.

18. The system of claim 10, wherein the MBC partner comprises the financial institution.

19. A computer readable medium including one or more instructions stored thereon and executable by a processor of a financial institution computing system to:
debit, by a processor of a financial institution computing system in response to a transaction request to transfer a first amount of funds denominated in a math-based currency (MBC) from a financial account denominated in a fiat currency and assigned to an account holder, the financial account by a second amount of funds denominated in a fiat currency and equivalent to the first amount of funds denominated in MBC, based on a first current exchange rate between fiat currency and MBC;
transmit, concurrently with the debiting, by the processor to an MBC partner, a request for the first current exchange rate;
transmit, concurrently with the debiting, by the processor to the MBC partner, instructions to:
create a temporary account at the MBC partner denominated in MBC, the temporary account associated with the financial institution and separate from the financial account associated with the account holder,
exchange, from fiat currency at a reserve account provided by and assigned to the financial institution computing system and denominated in the fiat currency, the second amount of funds to MBC currency at the MBC partner, credit the temporary account with funds from the MBC partner comprising the first amount, and
transfer the first amount of funds in MBC from the temporary account to the recipient;
receive, by the processor from the account holder, a confirmation in response to a transaction confirmation request;
transmit, by the processor to the MBC partner in response to receiving the transaction confirmation request, a request for a second current exchange rate between the fiat currency and the MBC; and
verify, by the processor, that the second current exchange rate is within a predetermined threshold of a first current exchange rate, wherein the financial account is debited in response to the verifying that the second current exchange rate is within the predetermined threshold of the first current exchange rate.

20. The computer readable medium of claim 19, the transaction confirmation request including an indication of at least one of the first amount in the MBC, the second amount in the fiat currency, and fees associated with the transaction.

* * * * *